Dec. 25, 1934.  F. W. EDWARDS  1,985,770
PRESSURE OPERATED VALVE
Filed Feb. 5, 1931  2 Sheets-Sheet 1
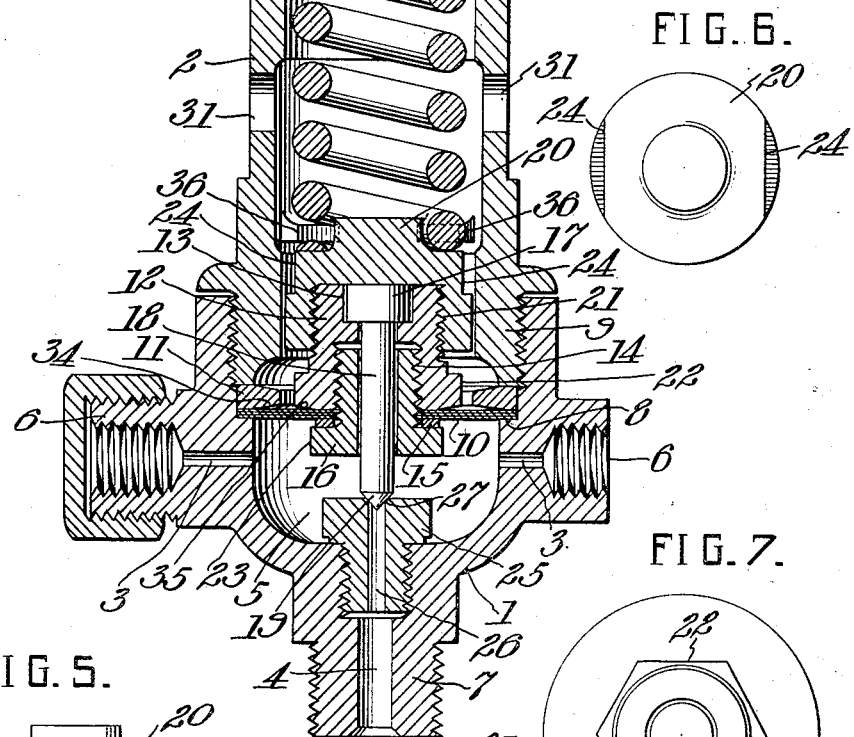
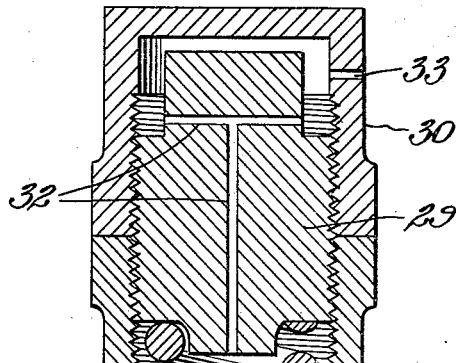
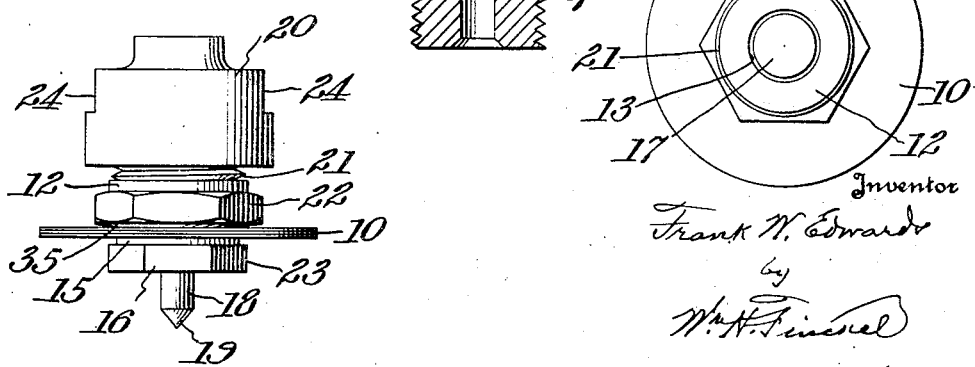
Inventor
Frank W. Edwards
by
W. H. Finckel
Attorney Dec. 25, 1934.   F. W. EDWARDS   1,985,770
PRESSURE OPERATED VALVE
Filed Feb. 5, 1931   2 Sheets-Sheet 2
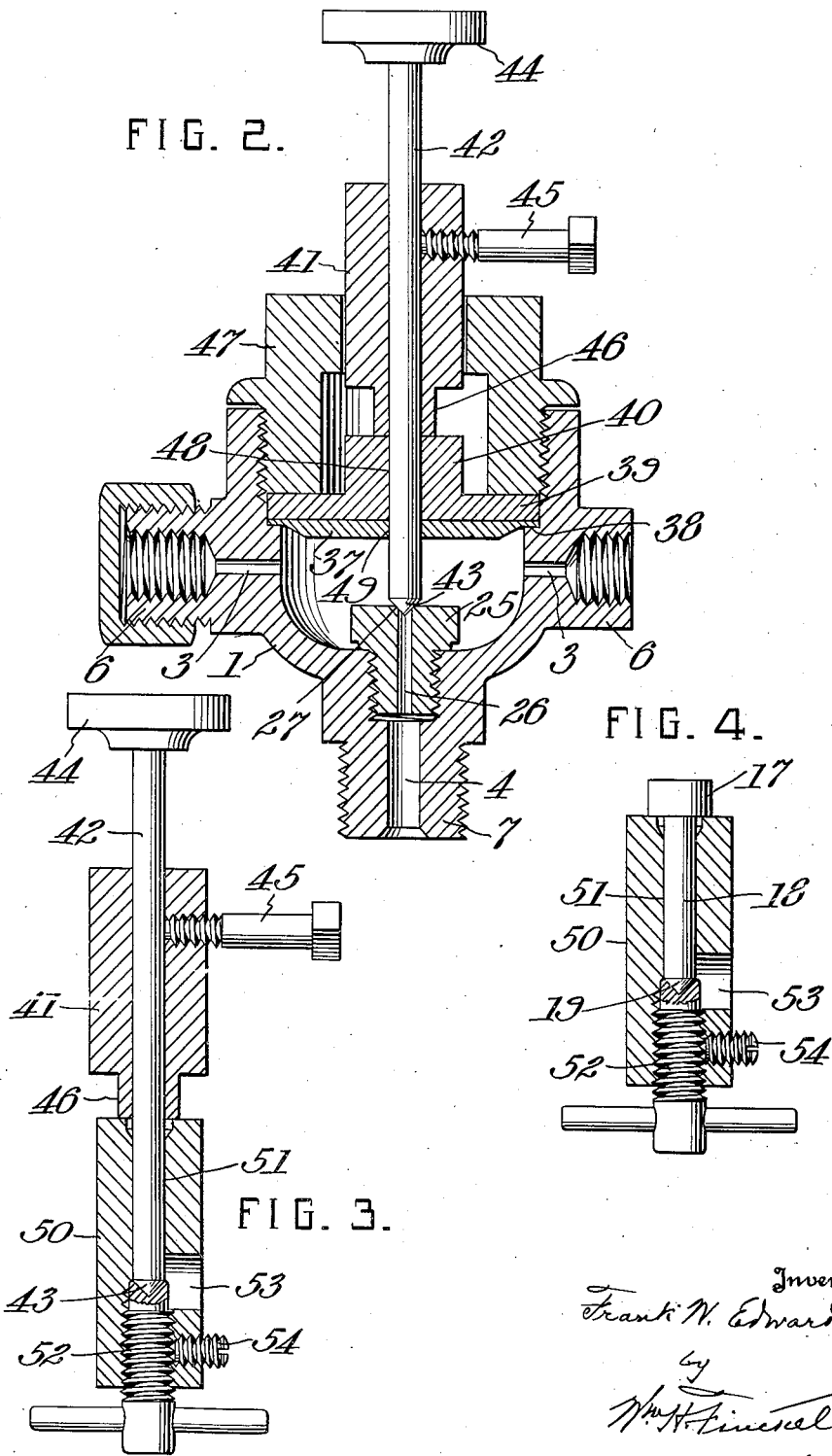

Patented Dec. 25, 1934

1,985,770

UNITED STATES PATENT OFFICE 1,985,770

PRESSURE OPERATED VALVE

Frank W. Edwards, Chicago, Ill., assignor to The Ohio Injector Company of Illinois, Chicago, Ill., a corporation of Illinois Application February 5, 1931, Serial No. 513,706

8 Claims. (Cl. 137—153)

This invention relates, broadly, to pressure operated, or pressure responsive, valves, and particularly to check valves, commonly known as terminal checks, such as are used in pressure or force feed lubrication systems, for example such as the systems disclosed in my copending applications for patent for Lubrication assembly, filed June 6, 1930, Serial No. 459,573, Lubrication assembly for locomotives, filed December 6, 1930, Serial No. 500,623, patented July 4, 1933, No. 1,-917,191, and Terminal valves for force feed lubricators, filed July 8, 1927, Serial No. 204,213, patented June 9, 1931, No. 1,808,978, and in my copending joint application with Fordyce B. Farnsworth for patent for Lubricators, filed September 10, 1928, Serial No. 304,862, patented November 8, 1932, No. 1,886,659.

The object of the invention is to provide in check valves of the general type used in connection with air brake systems, improvements whereby the accuracy of assembly and adjustment, the efficiency and the length of life of such valves may be enhanced.

The invention contemplates a check or pressure actuated valve, having a body provided with fluid inlet and outlet ports, one of same, usually the outlet port, carrying a valve seat. Arranged in the valve body is a pin valve and diaphragm assembly held in adjusted position by means of a bonnet which preferably houses a spring for variably applying pressure to the diaphragm and to the pin valve. And it is in the pin valve assembly and in the manner in which the pin valve may be gaged and adjusted relatively to its seat in the valve body that the invention particularly resides, as will be explained more fully hereinafter and finally claimed.

In the accompanying drawings illustrating the invention, in the several figures of which like parts are similarly designated, Figure 1 is an axial sectional elevation of a valve embodying the features of the invention. Fig. 2 is a sectional elevation showing the valve body and tools for gaging the proper length and setting of the pin valve and its seat. Fig. 3 is a sectional elevation showing a further gaging operation and the tools therefor. Fig. 4 is a sectional elevation showing the gaging of the length of the pin valve as determined by the operations illustrated in Figs. 2 and 3. Fig. 5 is a side elevation of the pin valve and diaphragm assembly. Fig. 6 is a plan view of the thrust cap of the pin valve assembly. Fig. 7 is a plan view of the pin valve and diaphragm assembly with the thrust cap of Fig. 6 removed.

The gaging tools herein described are particularly claimed in my application for patent therefor filed as a division hereof on June 27, 1934, Serial No. 732,739.

The valve has a body 1 and a bonnet 2. The body 1 is provided with one or more inlet openings or ports 3 and an outlet opening or port 4, and all of these openings communicate with a pressure chamber 5 within the body and are adapted for connection with pipes or other conduits by means of screwthreaded or otherwise appropriately treated connecting bosses 6 and 7 respectively.

The body is counterbored to provide an annular shoulder or seat 8 and is screwthreaded above this seat to receive the complementally screwthreaded shank 9 of the bonnet 2. Upon the seat 8 rests the diaphragm 10, preferably of the multi-plate flat type, and it is held pressure tight against this seat by a retaining ring 11 against which bears the end of the screwthreaded shank 9.

Supported by the diaphragm 10 is the pin valve assembly. This assembly comprises a pin valve retainer 12 having a top recess 13 and a screwthreaded bore 14, a slip washer 15, a tubular diaphragm retaining member 16 screwed into the bore 14 and fixedly uniting the diaphragm 10 and pin valve retainer 12, a pin valve having a head 17 seating in the top recess 13 of the retainer 12 and a shank 18 passing through the member 16 and pointed at its end as indicated at 19, and a thrust cap 20 interiorly screwthreaded to engage the screwthreaded exterior 21 of the retainer 12.

The pin valve retainer 12 and the diaphragm retaining member 16 are provided with non-cylindrical, preferably hexagonal portions 22 and 23, respectively, whereby wrenches may be applied to them for effecting their assembly on the diaphragm 10, and the thrust cap 20 is provided with flattened surfaces, as indicated at 24 for a similar purpose.

A seat member 25 for the pin valve is threaded into the valve body 1 and has an axial passage 26 so formed at its upper end as to provide a proper seat 27 for the pointed end 19 of the pin valve. This passage 26 is preferably in axial alinement with the outlet port 4 and communicates therewith. Sufficient lateral clearance is provided in the recess 13 and in the bore of the diaphragm retaining member 16 to permit the pointed end 19 of the pin valve to properly register with its seat 27 in the seat member 25.

Obviously, the diaphragm 10 will normally hold the pin valve seated and the check valve thus closed, but in order that pressures in excess of those which may be withstood by the diaphragm may be handled by the check valve, the diaphragm is loaded by means of a compression spring 28 which seats upon the thrust cap 20 at one end and against an adjustable plug 29 at the other end. This plug 29 is screwthreaded into the upper end of the tubular bonnet 2 and may be fixed in adjusted position by means of a lock cap 30. By these means the check valve may be adjusted for operation at any pressure of a range of pressures determined by the stiffness of the diaphragm 10 and the stiffness of the spring 28 and its adjustment by means of the plug 29.

In order that no dashpot effect may be produced within the bonnet 2, openings 31 may be provided therein and, in addition, the plug 29 may be bored, as indicated at 32, and the cap 30 provided with a vent 33.

The diaphragm retaining ring 11 and the pin valve retainer 12 have their diaphragm contacting faces so shaped, as by bevelling, as indicated at 34 and 35, respectively, that upon flexure of the diaphragm 10 under the influence of pressure in chamber 5 there will be no tendency to shear the diaphragm between the edges of the members 11 and 12. Furthermore, upward flexure of the diaphragm is limited by stops 36 carried by the bonnet 2 and projecting into the path of movement of the thrust cap 20, with the top surface of which they are adapted to engage.

In valves of this general type as heretofore constructed, wherein the operating parts, particularly the pin valve and diaphragm assembly are enclosed and concealed when assembled in the body, it is difficult to determine whether or not the pin valve seats properly. This is particularly true in case replacements and repairs are necessary.

In valves constructed in accordance with this invention this uncertainty is removed, and suitable tools, as hereinafter particularly described, may be used to properly gage the parts and insure their proper assembly and functioning.

It will be noted that when the pin valve and diaphragm assembly is properly made, as shown in Figs. 1 and 5, there can be no relative axial movement between the parts, particularly as regards movement between the pin valve 18 and its retainer 12. This latter is due to the fact that the head 17 of the pin valve is of such a length as to snugly fit between the bottom of the recess 13 and the face of the thrust cap 20 which contact with it. Consequently when the assembly is properly fixed in the body 1, with the seat member 25 in adjusted position, the distance between the bottom of the recess 13 and the seat 27 will remain constant so long as a diaphragm of a given thickness is used. If the thickness of the diaphragm is changed, this distance will be changed, but the change in length of pin valve may be accurately determined and a suitable pin valve supplied by gaging the distance from the seat 27 to the bottom of recess 13.

It will be noted, further, that the pin valve may be removed without disturbing the diaphragm, simply by removing the thrust cap 20. Thus, if necessary, the distance referred to may be gaged if, when otherwise properly adjusted, the valve fails to open when it should, or opens when it should not, or leaks.

In short, the only movement which can occur between the point 19 of the pin valve and its seat 27 is a movement dependent upon the diaphragm, whether due to pressure in chamber 5, as is desired, or due to substitution of a diaphragm of a thickness different from that for which the pin valve was originally fitted, and the latter may be gaged.

In Fig. 2 is shown a valve body 1, like that shown in Fig. 1, provided with a seat member 25 in proper adjusted position, and tools for effectively gaging the length of pin valve necessary for cooperation therewith when a diaphragm of predetermined thickness is to be used. Or, conversely, when a pin valve of predetermined length is to be used, the thickness of diaphragm necessary or the adjustment of the seat member 25 may be determined by use of these tools. However, as the proper operation of the valve is largely dependent upon the number of laminæ of the diaphragm, and hence its stiffness, and as the seat member 25 should be screwed down hard into fixed relation to the body, it is usually the length of the pin valve which is changed to suit the diaphragm and seat member.

The tools shown in Fig. 2, include a false diaphragm piece 37 of rigid plate form, machined at its edge 38 to a thickness simulating that of the diaphragm to be used, (a number of these having edges of different thicknesses may be furnished) a retainer disk 39 having a central lug 40, a gage sleeve 41, and a gage rod 42 having one end 43 pointed in the same manner as a pin valve and its other end provided with a head or finger piece 44. The gage sleeve 41 is provided with a set screw 45 by which its adjustment relatively to the gage rod 42 may be fixed, and has a reduced portion 46 at one end for a purpose later explained. These tools, particularly the false diaphragm 37 and retainer disk 39 are primarily adapted for the fitting up of new valves at the factory, but the gage sleeve 41 and gage rod 42 may be used in fitting pin valves and diaphragms for replacement and repair.

As hereinbefore stated, the several false diaphragm pieces 37 provided may have edges 38 of thicknesses to simulate diaphragms of various thicknesses or numbers of laminæ, and although Fig. 1 shows a diaphragm of three laminæ, Fig. 2, for the sake of variety, shows a false diaphragm piece having an edge of the thickness of a two-lamina diaphragm. Thus the pin valve as shown in Figs. 3 and 4 is shorter than that shown in Fig. 1 because it is of a length to fit the installation gaged by Fig. 2.

The thickness of the retainer disk 39 from its bottom surface to the top surface of the lug 40 is the same as the distance from the lower face of the pin valve retainer 12 in contact with the diaphragm to the surface of the bottom of the recess 13 therein. Thus the combined thicknesses of the machined edge of the false diaphragm piece and the retainer disk is equal always to the distance between the bottom of the recess 13 of the retainer 12 and the seat 8 of body 1 when a diaphragm 10 of which the false diaphragm piece 37 is a counterpart is used. This being the case, it will be apparent that by measuring from the seat 27 to the top surface of the lug 40 the length of the shank 18 of the pin valve suitable for the particular installation will be ascertained.

With the false diaphragm piece 37 and retainer disk 39 properly positioned in the body and resting upon the diaphragm seat 8 thereof, a false bonnet 47 is screwed down upon them to hold them in place. Then the gage rod 42, freely slidable relatively to gage sleeve 41 is passed through the holes 48 and 49 in the piece 37 and disk 39, respectively, and is seated with its pointed end 43 in the seat 27 of the seat member 25. Then the reduced end 46 of the sleeve 41 is permitted to contact with the upper surface of the lug 40 of disk 39, and set screw 45 is tightened to hold the rod and sleeve in the adjustment thus obtained. Considering the just preceding descriptive matter, it will be apparent that the measurement thus taken gives the proper length for a pin valve to be used in installations requiring a two-lamina diaphragm. Other pin valve lengths may be ascertained by substituting other false diaphragm pieces of different thicknesses.

Referring now to Fig. 3, it will be seen that the measurement just obtained may be transferred to a gage block 50 having an interior bore 51 in which is arranged a micrometer screw 52 the end of which is shaped to receive the pointed end 43 of the gage rod 42. With the reduced end 46 of the sleeve 41 at the top of the gage block and the pointed end of the gage rod 42 extending into its bore 51, the micrometer screw is run in or backed off until the end 46 of the sleeve just seats upon the top of the gage block, proper positioning of the pointed end 43 in the screw 52 being meanwhile observed through an opening 53 in the block. The set screw 54 is then tightened to maintain the proper setting of the micrometer screw 52.

With the established measurement thus transferred to the gage block 50, it will be apparent that when the pin valves are made they may be tested for length of shank in the gage block, as shown in Fig. 4, and any discrepancy as to length accurately determined.

It is, of course, desirable to test the actual installations of diaphragms and pin valve retainers to see that the pin valves will fit them and to ascertain what, if any, changes are required, and it is necessary to make similar gage tests when repairs and/or replacements are necessary, and it is for accommodating the gage sleeve 41 to this use that its lower end is reduced at 46, the reduced portion being of such a diameter and length that it will fit easily within the recess 13 of the pin valve retainer 12 and seat against the bottom of such recess.

The whole pin valve and diaphragm assembly, as shown in Fig. 5, may be inserted in and removed from the valve body 1 as a unit, the inside diameter of the diaphragm retaining ring 11 being such that it will easily slip over the thrust cap 20.

As previously stated, the pin valve may be inserted, removed and/or replaced without disturbing the diaphragm and vice versa.

Moreover, the head 17 of the pin valve being held between the bottom of recess 13 and the thrust cap 20, any movement of the diaphragm, even the slightest movement thereof, will be transferred to the pin valve, thus making a very sensitive, responsive valve.

Various changes other than and in addition to those specifically referred to are contemplated as within the spirit of the invention and the scope of the following claims.

What I claim is:—

1. In a pressure operated valve, a valve body, an assembly comprising a pin valve retainer, a diaphragm and a pin valve arranged within said body, said retainer being provided with means for carrying said pin valve and diaphragm, said means permitting removal of said pin valve from said retainer without disturbing the arrangement of said retainer and diaphragm in said body, and said diaphragm being removable from said retainer without disturbing the adjustment of said pin valve in said retainer.

2. In a pressure operated valve, a valve body, an assembly comprising a pin valve retainer, a diaphragm and a pin valve arranged within said body, said retainer provided with means for carrying said pin valve and diaphragm in substantially fixed relation to it, said means permitting removal of either said pin valve or said diaphragm from said retainer without disturbing the assembly of the other with respect to the retainer, and said pin valve being removable from said retainer without disturbing the arrangements of said retainer and diaphragm in said body.

3. In a pressure operated valve, a valve body, an assembly comprising a pin valve retainer, a diaphragm and a pin valve arranged within said body, said retainer being provided at one end with a recess, said pin valve having a head arranged in said recess and a shank extending through said retainer, means cooperating with said head for holding said head in predetermined fixed axial relation to said retainer within said recess, and means for securing said diaphragm at the other end of said retainer, said pin valve, retainer and diaphragm being removable as a unit from said body, and said pin valve being removable from said retainer without disturbing the arrangement of said diaphragm in said body.

4. In a pressure operated valve, an assembly comprising a pin valve retainer, a diaphragm and a pin valve, said retainer being provided with an axial recess and a bore, said pin valve provided with a head seated in said recess, a cap applied to said retainer for holding said head in said recess, and a diaphragm retaining member secured in said bore and serving to affix said diaphragm to said retainer, said retainer member providing a guide for said pin valve.

5. In a pressure operated valve, an assembly comprising a pin valve retainer, a diaphragm and a pin valve having a head and a shank, said retainer provided with an axial recess and a bore, said pin valve head seated in said recess, a cap applied to said retainer for holding said head in said recess in fixed axial relation to said retainer, and a diaphragm retaining member secured in said bore and serving to affix said diaphragm to said retainer, the shank of said pin valve extending through and guided by said diaphragm retaining member.

6. In a pressure operated valve, a pin valve retainer exteriorly screwthreaded and provided with a recess and a communicating screwthreaded bore, a pin valve having a head arranged in said recess and a shank, a cap engaging the exterior screwthread of said retainer for holding said head in said recess in predetermined position axially of said retainer, a diaphragm, and a diaphragm retaining member threaded into said bore for securing the diaphragm to the retainer, said pin valve shank extending through and guided by said diaphragm retaining member.

7. In a pressure operated valve, a valve body having an inlet opening and an outlet opening and a diaphragm seat, said outlet opening provided with a valve seat, a pin valve and diaphragm assembly, an assembly comprising a pin valve retainer having a recess and a bore, a pin valve having a head seated in said recess and a shank extending through said bore, a thrust cap applied to said retainer and serving to hold said head in said recess, and a diaphragm carried by said retainer, said diaphragm seated on said diaphragm seat and supporting the assembly within said body, the shank of said pin valve seating against said valve seat, means including a bonnet assembled on said body for holding said diaphragm in fixed relation to its seat, and a resilient member retained within said bonnet and bearing against said thrust cap for loading said diaphragm, said pin valve being removable from said retainer without disturbing the arrangement of said diaphragm in said body.

8. In a pressure operated valve, a valve body provided with an inlet opening and an outlet opening, a valve seat at said outlet opening, a pin valve for cooperation with said seat, a pin valve retainer carrying said pin valve, a diaphragm connected with said retainer and held in said body and by which said retainer and pin valve are supported relatively to said valve seat, said pin valve being removable from said retainer without disturbing the arrangement of said diaphragm in said body, whereby the length of the pin valve relatively to the valve seat and retainer may be gaged by means inserted in place of said pin valve

FRANK W. EDWARDS.

CERTIFICATE OF CORRECTION.

Patent No. 1,985,770.  December 25, 1934.

FRANK W. EDWARDS.

It is hereby certified that error appears in the printed specification of the above numbered patent requiring correction as follows: Page 1, first column, line 8, after the serial number and comma "459,573," insert the words patented April 18, 1933, No. 1 ,904,295,; and page 3, second column, line 68, claim 7, for "an" read said; and that the said Letters Patent should be read with these corrections therein that the same may conform to the record of the case in the Patent Office.

Signed and sealed this 12th day of February, A. D. 1935.

(Seal)

Leslie Frazer
Acting Commissioner of Patents.